US009906027B2

(12) United States Patent
Boe et al.

(10) Patent No.: US 9,906,027 B2
(45) Date of Patent: *Feb. 27, 2018

(54) TRANSFERRING ELECTRICAL POWER FOR SUBSEA APPLICATIONS

(71) Applicant: SIEMENS AKTIENGESELLSCHAFT, München (DE)

(72) Inventors: Ove Boe, Tanem (NO); Espen Haugan, Trondheim (NO)

(73) Assignee: Siemens Aktiengesellschaft, München (DE)

( * ) Notice: Subject to any disclaimer, the term of this patent is extended or adjusted under 35 U.S.C. 154(b) by 737 days.

This patent is subject to a terminal disclaimer.

(21) Appl. No.: 14/282,579

(22) Filed: May 20, 2014

(65) Prior Publication Data

US 2015/0008765 A1    Jan. 8, 2015

(30) Foreign Application Priority Data

Jul. 3, 2013    (EP) ...................................... 13174850

(51) Int. Cl.
*H02J 3/00* (2006.01)
*H02J 3/22* (2006.01)
*H02J 3/34* (2006.01)

(52) U.S. Cl.
CPC .................. *H02J 3/00* (2013.01); *H02J 3/22* (2013.01); *H02J 3/34* (2013.01); *Y10T 307/766* (2015.04)

(58) Field of Classification Search
None
See application file for complete search history.

(56) References Cited

U.S. PATENT DOCUMENTS

| 2007/0114978 A1* | 5/2007 | Lindahl ..................... H02J 3/18 |
| | | 323/207 |
| 2009/0226262 A1 | 9/2009 | Karstad et al. |
| 2013/0033103 A1* | 2/2013 | McJunkin ................. H02J 3/22 |
| | | 307/11 |
| 2013/0169044 A1* | 7/2013 | Stinessen .................. H02J 3/34 |
| | | 307/18 |

FOREIGN PATENT DOCUMENTS

| WO | WO0126201 A1 | 4/2001 |
| WO | WO2013039403 A1 | 3/2013 |

OTHER PUBLICATIONS

European Search Report dated Dec. 13, 2013 for corresponding EP Application No. 13174850.1.
European Search Report for European Application No. 13174850. 1-1804, dated Jul. 19, 2017.

* cited by examiner

*Primary Examiner* — Jared Fureman
*Assistant Examiner* — Aqeel Bukhari
(74) *Attorney, Agent, or Firm* — Lempia Summerfield Katz LLC (57) ABSTRACT

A method is provided for transferring electrical power. AC power is generated and guided at least partially underwater. The AC power is guided through a cable from a first end of the cable to a second end of the cable. A frequency of the AC power guided through the cable is adjusted in dependence of a length of the cable between the first end and the second end of the cable.

24 Claims, 8 Drawing Sheets

TRANSFERRING ELECTRICAL POWER FOR SUBSEA APPLICATIONS

RELATED CASES

The present patent document claims the benefit of EP 13174850.1, filed Jul. 3, 2013, which is hereby incorporated by reference.

FIELD

The present embodiments relate to transferring electrical AC power in the sea, in particular to a subsea grid (e.g., in order to provide electrical power at a subsea exploration site).

BACKGROUND

Conventional electrical AC power cable transmission may be limited in distance due to the cable properties. Typical maximum AC transmission distance at 50/60 Hz may be between 100 km and 200 km. If longer distances are needed, today's state of the art solution is DC transmission. For subsea power, longer than 200 km for arctic areas and hydro carbon reservoirs with step outs up to 600 km from shore are explored. For powering consumers at the subsea exploration site, such as pumps, compressors, motors etc., AC power may often be required. Therefore, in a conventional system, the DC power transmitted to the sea ground has to be converted into AC power in order to be appropriate to power the consumers at the subsea exploration site. However, converting the DC power to an AC power requires large and heavy equipment that poses a number of problems for setting up the exploration site and also increases the costs of the system. When designing a subsea power grid, reliability may be one of the main key factors. To increase reliability of a subsea power grid, it may be important to limit the complexity and also to limit components with low reliability specially of the non-redundant types of components. Today, only medium voltage distribution technology for AC solution may be reliable. DC power needs to be converted to AC power subsea for subsea DC transmission systems. The DC to AC converting system may be a very complex system and include an extreme high amount of components, reducing reliability compared to a subsea AC transmission system.

SUMMARY

The scope of the present invention is defined solely by the appended claims and is not affected to any degree by the statements within this summary.

There may be a need for transferring electrical power in the sea, which facilitates powering of electrical AC power of subsea consumers with step out longer than today's maximum transmission distance of typical 100-200 km. Providing the longer step out with an increase in the reliability and at the same time reduction in the size of the equipment would be beneficial. Further, there may be a need to provide AC consumers with AC power in a more simple manner and requiring smaller or lighter equipment than a conventional system.

According to an embodiment, a method for transferring electrical power, in particular in the sea (in particular to a subsea grid) or over land is provided. The method includes generating AC power, guiding, in particular at least partially under water, the AC power through a cable from a first end of the cable to a second end of the cable, and adjusting a frequency of the AC power guided through the cable in dependence of a length of the cable between the first end and the second end of the cable.

The electrical power may originally be supplied from a conventional utility grid above the sea level or may be provided by a particular generator arranged above the sea level. The electrical power from the conventional grid may have a frequency of, for example, 50 Hz or 60 Hz. Using a converter, such as an AC-DC-AC converter, the electrical power provided by the utility grid or provided by the generator may be converted to an AC power having a desired frequency. Thereby, the AC-DC-AC converter may include an AC-DC converter portion, which is followed by a DC-AC converter portion. The AC-DC converter portion as well as the DC-AC converter portion may both include a number of power transistors or controllable switches, such as IGBTs. Using pulse width modulation technology, the converter may generate at some output terminals an AC power stream having a desired frequency and voltage.

The cable may be arranged at least partially within the sea, in particular reaching from a top side facility down to a subsea exploration site at a sea ground and potentially further extending at the sea ground to equipment which may be distributed over a large area on the sea ground. The cable may be a portion of or may form a subsea distribution grid. Further, the cable may include a number of cable sections connected to each other in any topology, such as series connection, parallel connection, star-like connection, and/or ring-like connection.

Adjusting the frequency may, for example, include sending a control signal to a converter, in particular an AC-DC-AC converter. The control signal may cause the converter to create pulse width modulation signals, which are supplied to the DC-AC converter portion. These particular pulse width modulation signals may cause the controllable switches to open and close according to the selected frequency such that the converter outputs an AC power (stream) having the adjusted/selected frequency.

The length of the cable may be predetermined, measured, and/or obtained in any manner. Depending on the length of the cable, resonances of electrical properties, such as voltage and/or current, may occur when the AC power having a particular frequency is guided through the cable. Thereby, the frequency peak positions (e.g., peak positions of the resonances having large voltage and/or large current) may depend on the length of the cable. In turn, given a particular length of the cable, there may be resonance peaks at particular resonance frequencies, which depend on the length of the cable. According to an embodiment, the frequency is adjusted such that the frequency does not match a resonance frequency, but is far enough apart from the resonance frequency such that the amplitude of the resonance, in particular regarding voltage and/or current, is in an acceptable range.

According to an embodiment, the cable may be described by a circuit, including one or more capacitors arranged along the cable or along a length of the extent of the cable. According to this embodiment, the cable capacitor effect may be used to stabilize the subsea voltage from no-load to load (i.e., from a situation where (substantially) no load (i.e. having substantially no power consumption) is connected to the second end of the cable to a situation when there is a load, in particular a maximal load (i.e. consuming maximal power), connected to the second end of the cable). Thereby, the cable capacitor effect may be ensured to keep a voltage difference between the two situations (i.e., no-load and load) within acceptable limits. Thereby, tripping one or more equipment components may be avoided or at least the chance reduced. In particular, the frequency may be adjusted to be higher than the lowest resonance frequency of the cable. Thereby, an alternative for the extreme long step-outs (very long cable) where the first cable resonance comes in conflict with the fundamental 50 Hz in a standard AC system may be provided.

According to an embodiment, the frequency is adjusted such that a voltage ratio (Uload/Uin) between a second voltage (Uload) and a first voltage (Uin) changes less than a threshold, when a power consumption of a load connected to the second end of the cable changes from a first value to a second value, such as from 0 MW to 100 MW. The second voltage represents a potential difference between the second end of the cable and a reference potential, wherein the first voltage represents a potential difference between the first end of the cable (or a potential of a power source upstream of the first end of the cable) and the reference potential.

A change of the voltage ratio may for example be obtained as follows:

First, it may be modelled to have a load connected to the second end of the cable, wherein the load has a power consumption of a first value. For this configuration, the first voltage ratio may be calculated as a ratio between the second voltage and the first voltage. Thereupon, it may be modelled that another load having a power consumption of a second value is connected to the second end of the cable. In this configuration, the second voltage ratio may be formed as a ratio between the second (calculated) voltage and the first voltage. Thereby, in both configurations having the different loads, the first voltage may be predetermined (e.g., set as a nominal output voltage of the power supply), and the second voltage may be computed in each situation. In order to derive the voltage ratio change, a difference between the first voltage ratio and the second voltage ratio may be formed. According to an embodiment, the frequency is adjusted/selected such that the voltage ratio change or the absolute value of the voltage ratio change is as small as possible or lies below a threshold, wherein other criteria are met, such as criteria involving a limitation of an input current provided by the power supply to the cable.

The first value and the second value may be any values of power consumption, but may be different values. In particular, the first value may represent a situation, when substantially no load (or e.g. an average load) is connected to the second end of the cable. Further, the second value of power consumption may represent the situation, when a maximal expected power consumption is established (i.e., when a maximal expected number of equipment is powered and thus connected to the second end of the cable). By selecting or adjusting the frequency such that the voltage ratio change is less than the threshold, voltage changes upon changing power consumption of the load connected to the second end of the cable may be kept in acceptable limits in order to protect equipment from damage. Furthermore, thereby, tripping sensitive equipment may be avoided, and, instead, operation of the subsea application may continue.

According to an embodiment, the method further includes supplying the AC power from the second end to the load. In particular, for adjusting/selecting the frequency, the electrical properties of the system (e.g., including the transmission line from the power supply to the load) for different candidate frequencies may be calculated/modelled using a physical/mathematical representation of an equivalent circuitry representing the transmission/distribution system. Thereby, actually, no AC power may be provided to the load. When the frequency is appropriately adjusted such that the voltage ratio change is below the threshold, the AC power may actually be supplied from the second end to the load. In this situation, with the correctly adjusted/selected frequency, even if the power consumption of the load changes, a voltage change may be maintained within acceptable ranges.

According to an embodiment, the absolute value of the threshold is 0.5, in particular 0.4, further in particular 0.3, even further in particular 0.2.

The smaller the absolute value of the threshold is, the less the voltage may change upon change of the power consumption of the load. According to an embodiment, the frequency may be, in a stepwise manner or continuously, selected/adjusted such that the absolute value of the voltage ratio change is minimal. In other embodiments, the absolute value of the voltage ratio change (e.g., for the plural test frequencies) may not be minimal, but other criteria may be met, such as criteria regarding limitation of the input current. Selecting/adjusting the frequency may be performed such that a number of different criteria are met. The criteria may be ordered having different priorities. The highest priority may be to achieve a small change (e.g., of the voltage change or the second voltage) upon changing the power consumption of the load. A further criterion however may include keeping an input current running through the cable within limits set by the properties of the cable. Thereby, a reliable operation may be ensured.

According to an embodiment, adjusting the frequency includes calculating plural voltage ratio changes for plural test frequencies, for each test frequency considering at least two test power consumptions of loads, in order to obtain the respective voltage ratio change. The frequency to be adjusted is selected from the plural test frequencies for which the calculated voltage ratio change is lower than the threshold.

Herein, the plural test frequencies may for example cover or lie in a range extending from 0 Hz to 350 Hz, or in another range. For all (e.g. every 10 Hz or 20 Hz or 50 Hz) the frequencies within this range, respective voltage ratio changes may be calculated. A circuit representation (e.g., equivalency circuit representation) of the transmission system may be used. The at least two test power consumptions of loads may, for example, include the power consumption of the first value and the power consumption of the second value. The first value and the second value may depend on the particular application. Further, the frequency to be adjusted may be selected based on the plural voltage ratio changes alone or may be based on the plural voltage ratio changes and other (e.g., calculated) electrical properties, such as regarding the input current. A number of other criteria may be included as well. Thereby, the adjustment or selection of the frequency may be performed in a simple and reliable manner.

According to an embodiment, the method further includes calculating plural input currents for plural test frequencies. Each input current represents a respective current of the generated AC power supplied to the first end of the cable. For each test frequency, at least one test power consumption of a load is considered. The frequency to be adjusted is selected from the plural test frequencies for which the input current is within a range according to a rating of the cable.

The input current may be an electrical current flowing from the power supply into the cable at the first end of the cable. When the power consumption of the load connected to the second end is substantially zero, the input current may not be zero. For all frequencies higher than zero, there may be a reactive current flowing at no-load condition. Further, the current may be higher at no-load condition than at load condition. Thus, in particular, a maximal power consumption of the load may be considered in order to calculate or model the input current, which may flow when a particular frequency is adjusted. In particular, the frequency may be adjusted/selected such that two criteria are met, such as keeping the voltage ratio change relatively small (e.g., below the threshold), and keeping the input current within the operation range according to the rating of the cable. Thereby, it may be ensured that the equipment, in particular the cable and/or a power supply source and/or the connected load units are not damaged during the operation.

According to an embodiment, a frequency between resonance peaks according to a calculated voltage ratio is selected, in particular between a first and a second resonance peak or in particular between a second and a third resonance peak. The frequency further depends on properties of the cable, such as cross-sectional size and/or material of the cable. A resonance peak may be defined where a section or portion of a curve (e.g., relating the voltage ratio or the input current to the frequency) has relatively high values. The high values may be associated with respective resonance frequencies. Thus, according to this embodiment, frequencies are avoided where resonances occur. In particular, the frequency may be increased to lie beyond the first resonance frequency. By increasing the frequency instead of decreasing the frequency from the resonance frequency, a voltage/frequency relation in a transformer may be higher with the same amount of iron or other ferromagnetic material in the core, compared with a lower frequency. Thereby, in order to reach a same magnetic flux, less core material and/or lighter core material may be required compared to the lower frequency. Thereby, the equipment may require only small and light magnetic cores.

In the calculations of the voltage ratios in dependence of the frequencies and/or the input currents in dependence of the frequencies, also the electrical properties of the cable, in particular the cables cross-sectional size and/or material, may be taken into account. Thereby, the reliability and accuracy of the calculated voltage ratios, voltage ratio changes and input currents may be improved.

According to an embodiment, the method further includes transforming a voltage of the AC power to a higher voltage and supplying the transformed voltage to the first end of the cable (e.g., topside transformer).

The transmission of the transformed voltage may be more effective than without transforming the voltage of the AC power generated by the power supply. Thereby, the transforming may be performed by a (in particular topside) transformer. The transformer may be located above the sea level. Thereby, transforming may be simplified.

According to an embodiment, the method further includes transforming the AC power guided through the cable at the second end of the cable and supplying the transformed AC power to a load.

The load (e.g., arranged at subsea, such as at a ground of the sea) may require a particular AC voltage, which may be lower than the AC voltage used to transmit the AC power through the cable. Thereby, the transformer may advantageously be adjusted or set to transform the transmitted or guided AC voltage to a suitable subsea distribution grid voltage, which may suit a number of typical equipment units at the application side.

According to an embodiment, the frequency of the AC power is between 10 Hz and 300 Hz, in particular between 50 Hz and 150 Hz, further in particular different form 50 Hz, wherein in particular the cable is arranged at least partially, in particular 80% and 100% of the length of the cable, underwater.

Thereby, an AC transmission method may be provided for transmission of electrical power under water. Conventionally, only a DC transmission method may be used, but the DC transmission may have the problem that very complex equipment may be needed under water or in the subsea to convert energy or power from DC to AC, in order to provide AC power at the subsea exploration site.

According to an embodiment, the AC power is supplied from an AC power supply, such as a generator or a converter, to the first end of the cable. The generator may, for example, be connected to a wind turbine rotor or to a gas turbine. The converter may be connected to a conventional utility grid. Alternatively, the converter may be connected to an output terminal of a wind turbine or a gas turbine.

According to an embodiment, the first voltage is predetermined and the second voltage is calculated for a given power consumption of the load. A model of the cable is utilized, such as including plural PI-elements.

Each PI-element may include a series connection of a resistance and an inductance, wherein to the resistance or inductance a capacitor may be connected having another terminal of the capacitor connected to a reference potential, such as earth potential. The number of PI-elements may for example be between 200 and 1000, in particular between 300 and 600, further in particular around 500.

Thereby, a reliable modelling of the transmission of electrical power through the cable may be enabled. Thereby, given an input voltage generated by the power supply, given the length and the properties of the cable, given a transformation ratio of a potential topside transformer, given a transformation ratio of a potential subsea transformer and given the power consumption of the load connected to the second end of the cable, the second voltage (i.e. the voltage across the load) may be calculated and also the input current may be calculated for the plural test frequencies. Thereupon, the frequency meeting the one or more criteria may easily be selected.

According to an embodiment, the second end of the cable is between 100 m and 4000 m below sea level, wherein the cable has a length between 100 km and 1000 km, in particular between 200 km and 600 km, wherein the voltage at the cable is in particular between 80 kV and 100 kV. Thereby, typical needs in a subsea exploration may be met and supported.

According to an embodiment, the method further includes connecting a first reactor near the first end of the cable and/or connecting a second reactor near the second end of the cable, and/or connecting plural reactors at plural locations along the cable. The method may include, depending on the load, adjusting the frequency and/or the first voltage, in particular involving (dynamically) changing (in particular decreasing) the frequency when power consumption of the load changes (in particular increases).

The first reactor and/or the second reactor and the plural reactors may, in particular, provide an inductance, in order to counteract or balance a capacity effect of the cable. Thereby, the size of the first reactor (e.g., inductance) and/or the size of the second reactor may be determined from a number of calculations assigning the first reactor and the second reactor different sizes. When the first voltage is adjusted or changed depending on the load, a change of the second voltage may be kept below acceptable limits.

It should be understood that features individually or in any combination disclosed, described, applied or provided for a method for transferring electrical power in the sea may also be applied individually or in any combination to an arrangement for transferring electrical power in the sea according to an embodiment and vice versa.

According to an embodiment, an arrangement is provided for transferring electrical power in the sea (e.g., to a subsea grid). The arrangement includes a power source adapted to generate AC power, and a cable having a first end to which the AC power is supplied and being arranged to guide the AC power to a second end of the cable. The power source is further adapted to adjust a frequency of the AC power guided through the cable in dependence of a length of the cable between the first end and the second end of the cable.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. The embodiments will be described in more detail hereinafter with reference to examples of embodiment but to which the invention is not limited.

BRIEF DESCRIPTION OF THE DRAWINGS

Embodiments are now described with reference to the accompanying drawings.

DETAILED DESCRIPTION

The illustration in the drawings may be in schematic form.

Figure 1:
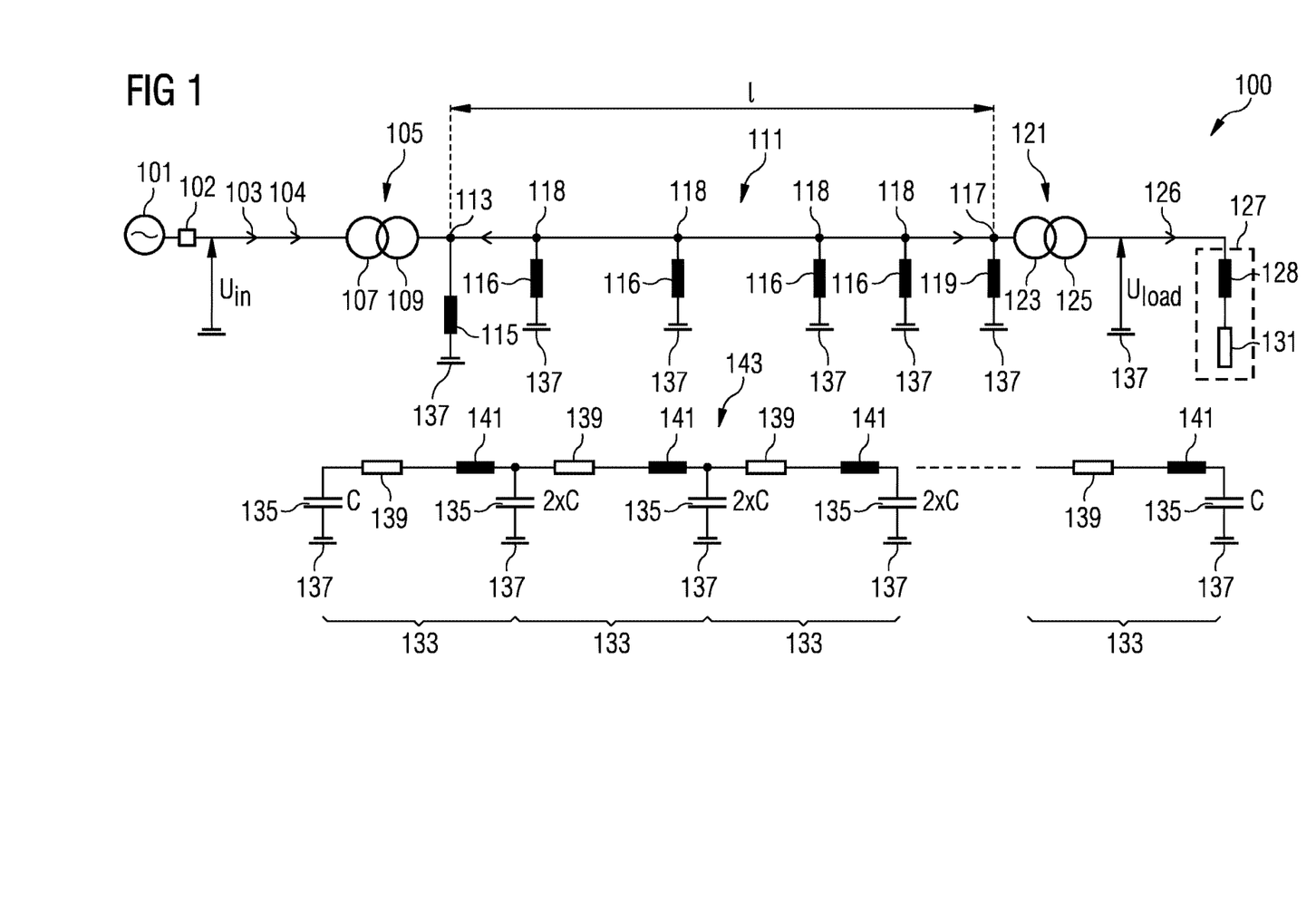
FIG. 1 schematically illustrates an arrangement for transferring electrical power according to an embodiment.

FIG. 1 schematically illustrates an arrangement 100 for transferring electrical power in the sea according to an embodiment. The arrangement 100 is for performing a method according to an embodiment. The arrangement 100, above the sea level, includes a power source 101 connected to a converter that are adapted to generate AC power 103 supplied to a topside transformer 105 having a primary coil 107, which is inductively coupled to a secondary coil 109. The topside transformer 105 transforms a voltage of the AC power 103 to a higher voltage and supplies the transformed voltage to a cable 101, which may at least partly be arranged under water, such as in the sea. The cable 101 may have a length between 100 km and 1000 km. Further, the cable may be used to supply the AC power 103 to a subsea exploration site or to supply to a subsea distribution grid.

The AC power 103 is associated with an input current 104. The voltage generated by the power supply 101 or output by the converter 102 is indicated in FIG. 1 with reference $U_{in}$ and is also referred to as first voltage. The topside transformer 105 provides the transformed voltage $U_{in}$ at a first end 113 of the cable 111. At this first end 113, a reactor 115 is connected (e.g., to an earth potential) to compensate for a capacitor effect of the cable 111. The reactor connected at the first end 113 of the cable 111 may have a suitable adjusted or selected inductance or reactance to compensate for the capacitor effect of the cable 111.

For around 200 km step outs (cable length) at 50 Hz in a conventional system, voltage may change from load condition to no-load condition due to the parallel capacitor effects in the cable. The stationary effect of the capacitors in the cable may follow according to $1/(j*w*C)$, where j is the imaginary number, $w=2*pi*frequency$ and C is the capacitance. When, according to an embodiment, frequency is reduced or increased from 50 Hz, also the effect of the capacitance in the cable may be reduced stationary.

The AC power 103 is then transferred through the cable 111 to a second end 117 of the cable 111. This second end 117 is located under water, in particular on a ground of the sea. At the second end 117 of the cable 111, a second reactor 119 is connected to the earth potential in order to compensate the capacitor effect of the cable 111. Close to the second end 117 of the cable 101, a subsea transformer 121 having a primary side 123 and a secondary side 125, which is inductively coupled to the primary side 123, is located. The subsea transformer 121 transforms the voltage at the cable 111 (e.g., a voltage between 80 kV and 120 kV, in particular around 90 kV) to a desired voltage at the subsea grid, for example to between 30 kV and 50 kV, in particular around 36 kV. At the secondary coil 125 of the subsea transformer 121, a load 127 is connected having an inductance 129 and a resistance 131 and further may include a capacitance (not shown). The load 127 may be a single load, may be a plurality of loads, and/or may represent an entire subsea distribution grid having plural loads, which may be connectable and disconnectable or switched on and off in any circuit topology.

According to an embodiment, the cable 111, in particular the electrical properties of the cable 111, is modelled using a series connection of a plurality of PI-elements 133.

Thereby, each PI-element 133 has a capacitor 135 connected to the earth potential 137 and a resistor 139 connected to one end of the capacitor 135 and further an inductance 141, which is connected in series with the resistor 139. The PI-elements 133 are connected in series as an equivalency circuit 143 for modelling or describing the electrical properties of the cable 111. The equivalence circuitry 143 is used according to an embodiment to calculate electrical properties of the arrangement 100, such as calculating a second voltage $U_{load}$ representing the voltage applied to the load 127 when the power supply 101 provides a first voltage $U_{in}$.

In particular, the equivalency circuit 143 may be used to calculate the second voltage $U_{load}$ given the first voltage $U_{in}$ for different power consumptions 126 of the load 127. Further, also the input current 104 may be calculated using the equivalency electric diagram or circuit 143 for a given first voltage $U_{in}$ and a given power consumption 126 of the load 127. Based on such calculations, further more detailed simulations may be performed in order to determine electric properties of the arrangement 100, based on which for example frequency of the AC power 103 and/or voltage $U_{in}$ of the AC power 103 may be selected or adjusted, The selection or adjustment may be in dependence of a length l of the cable 111 and in dependence of the power consumption 126 (e.g., including active power consumption and/or reactive power consumption) of the load 127. According to an embodiment, the reactors 115, 119 may be missing in the arrangement 100 illustrated in FIG. 1 or may be switched off or disconnected.

According to an embodiment, the power supply 101 is adapted to adjust a frequency of the AC power 103 in dependence of the length l of the cable 111 between the first end 113 and the second end 117 of the cable.

In other embodiments, additionally or alternatively, at least two reactors 115 and 119 may be connected to the cable, one of the reactors may be connected to the first end (or close to the first end) 113 of the cable 111 and another reactor 119 may be connected close to the second end 117 of the cable 111. According to still further embodiments, further reactors 116 may be connected along the cable 111 at plural locations 118, which may be spaced apart from each other. In particular, the locations 118 may be evenly spaced apart from each other. In particular, the arrangement 100 may exclusively or additionally be configured in a way such that inductances of the reactors 115, 119 and, for example, also of the further reactors 116, are selected in order to at least substantially compensate for reactive power generated in the cable 111. The values of the inductances of the reactors 115, 116, 119 may depend on the properties of the cable 111 and/or the frequency/voltage of the power supply and possibly on further parameters, such as voltage, cable length. As a rule of thumb, the cable 1/(w*C) may be the same as the total compensation of the parallel inductances w*L. In this case, w*L may cancel out the 1/(w*C).

According to an embodiment, the power supply 101 includes a converter for changing the frequency of the AC power 103 guided through the cable 111 in dependence of a value of the power consumption 126 of the load 127, which is connected to the second end (e.g., via the subsea transformer 121) of the cable 111.

A cable that is electrically described with resistance R [Ohm/m], inductance L [H/m] and capacitance C [F/m] may have cable resonances as a function of the cable travelling time. The wave velocity, v, of the cable, may be given by:

$$v=1/\operatorname{sqrt}(LC).$$

The travelling time τ of the cable is given by $$\tau=d/v.$$

Thereby, d (also referred to as l) is the length of the cable, for example the cable 111 illustrated in FIG. 1.

Resonances in the cable 111 may be found at the following travelling times (or frequencies):
1/4τ, 3/4τ, 5/4τ . . . .
Further, damping frequencies may be found at:
2/4τ, 4/4τ, 6/4τ . . . .

Figure 2:
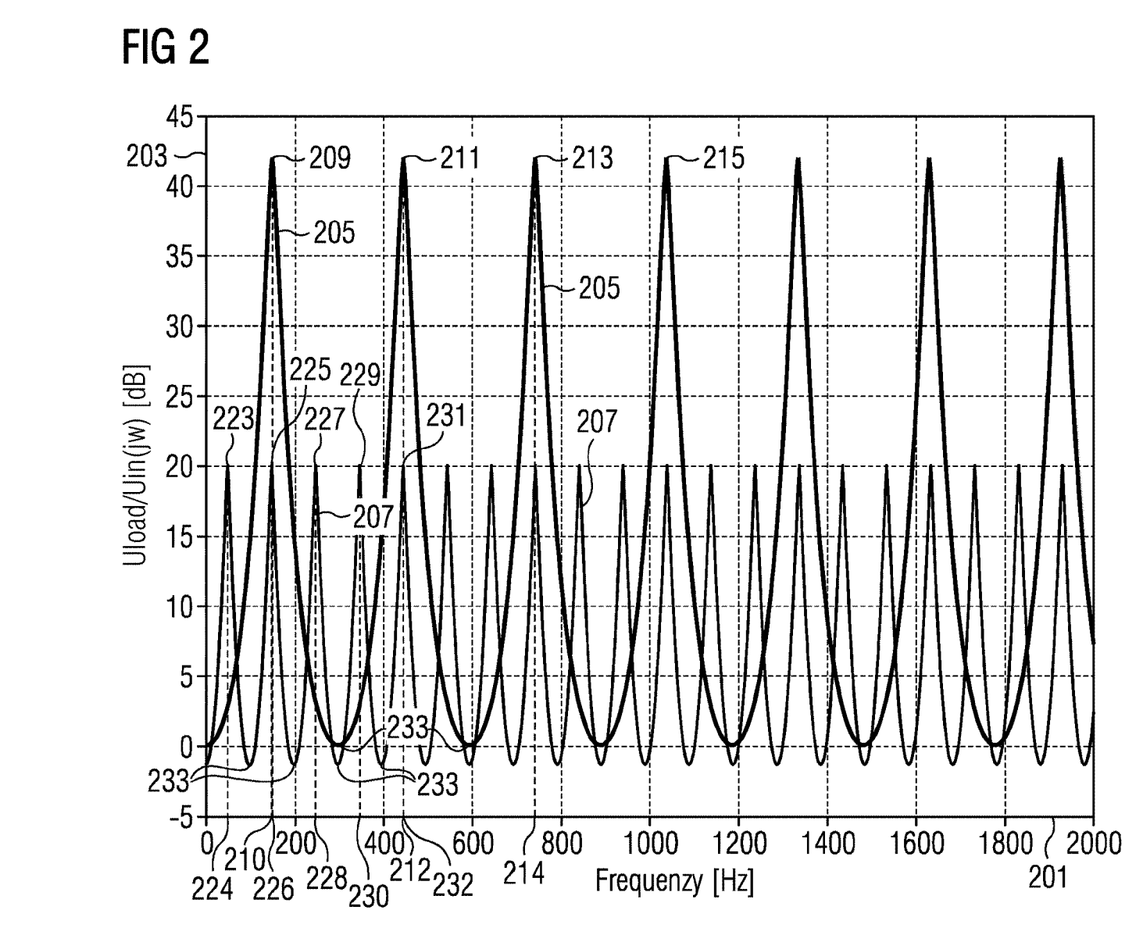
FIG. 2 illustrates a graph depicting a dependency of a voltage ratio observed in an arrangement of FIG. 1 in dependence of the frequency of the AC power.

FIG. 2 illustrates a so-called cable frequency plot illustrating a dependency of a voltage ratio (ordinate 203) from a frequency (abscissa 201). In particular, the voltage ratio is the ratio between the second voltage $U_{load}$ (see FIG. 1) and the first voltage $U_{in}$ (see FIG. 1). In particular, the curve 205 illustrates the situation of a length l of the cable of 200 km, while the curve 207 illustrates the situation, when the length l of the cable 111 is 600 km. The curves 205, 207 represent calculated or simulated curves, when the cable 101 is described or modelled with 500 PI-elements and the following electrical data (e.g. data from a 123 kV, 300 mm² cable):
Rc=0.0601 [Ohms/km]
Cc=0.17 e-6 [F/km]
Xc50=0.13 [Ohm/km]
Lc=4.1380 e-4 [H/km]

In particular, the curve 205 has resonance peaks 209 (first resonance peak), 211 (second resonance peak), 213 (third resonance peak), 215 (fourth resonance peak) and so on. In between the resonance peaks 209, 211, 213, 215, valleys of low values 221 are present. The valleys may correspond to the damping frequencies explained or defined above.

Further, the curve 207 includes a first resonance 223, a second resonance 225, a third resonance 227, a fourth resonance 229, a fifth resonance 231 and so forth. Also between these resonances 223, 225, 227, 229 and 231, valleys 233 are present.

It should be noted that the frequencies at which the resonance peaks occur for the cables of different lengths are at different resonance frequencies. In particular, the resonance 209 occurs at a frequency 210, the resonance 211 occurs at a frequency 212, the resonance 213 occurs at a frequency 214.

In contrast, the frequency of the cable of length 600 km for the resonance 223 occurs at the frequency 224, the resonance 225 occurs at a frequency 226, the resonance 227 occurs at a frequency 228, the resonance 229 occurs at a frequency 230 and the resonance 231 occurs at a frequency 232 and so forth. The frequencies 210, 212, 214 are different from the frequencies 224, 226, 228, 230, 232 and so forth. This observation is exploited according to embodiments to enable a reliable transfer of electrical power 103 from a topside facility to a subsea exploration site.

In particular, based on the relationship τ=d/v, the resonance or resonances 209, 211, 213, 215 should be at:
149.0, 447.1, 745.2, 1043.2, 1341.3 Hz for the cable of length 200 km and should be
49.7, 149.0, 248.4, 347.7, 447.1 Hz for a cable of length 600 km.

According to an embodiment, also an input current 104 in dependence of the frequency is calculated for the situations of cable lengths considered in FIG. 2.

Figure 3:
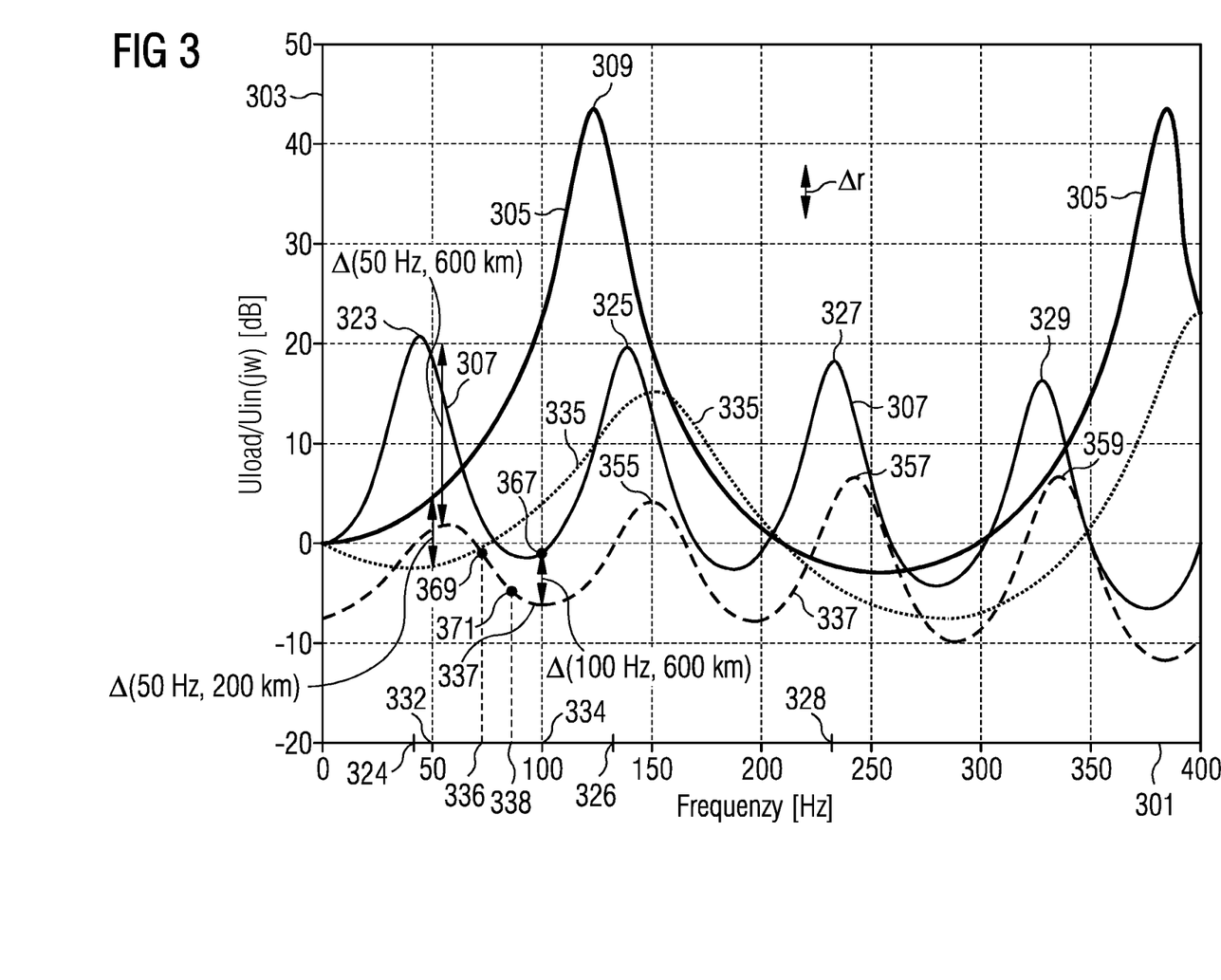
FIG. 3 illustrates a portion of the graph of FIG. 2 illustrating a method for transferring electrical power according to an embodiment performed by the arrangement of FIG. 1 according to an embodiment.

FIG. 3 illustrates a portion of the curves 205, 207 illustrated in FIG. 2 as the curves 305 and 307 for the situation when the power consumption 126 of the load 127 is substantially 0 (i.e., such that substantially no load 127 is connected to the second end 117 of the cable 111) as illustrated in FIG. 1.

In addition to this situation where no load is connected to the cable 101, FIG. 3 illustrates curves 335, 337 corresponding to the situation when a load of 80 MW is connected to the second end 117 of the cable 111. Thus, the curve 335 represents the situation when the length of the cable is 200 km and when the power consumption 126 of the load 127 is 80 MW. Further, the curve 337 represents the situation where the length of the cable is 600 km and the power consumption 126 of the load 127 is 80 MW. In particular, the transformers 105, 121 are 100 MVA transformers, the load impedance values are 90 kV, and the power factor is 0.95. All transformer and motor voltages in the arrangement 100 is 90 kV.

Figure 4:
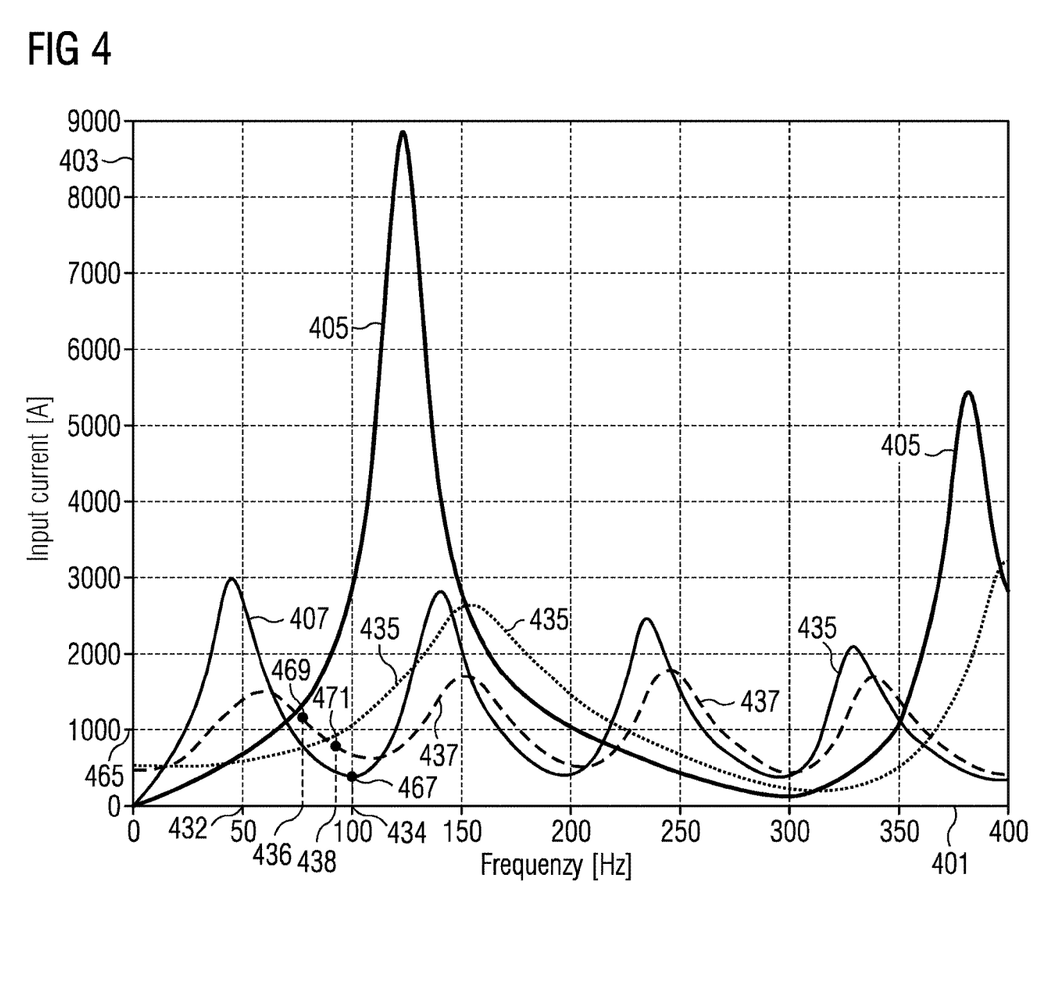
FIG. 4 illustrates a graph depicting an input current in dependence of a frequency corresponding to the graph of FIG. 3 and illustrating a method for transferring electrical power according to an embodiment performed by the arrangement of FIG. 1 according to an embodiment.

FIG. 4 further illustrates the input current 104 (ordinate 403) in dependence of the frequency (abscissa 401) for the length l of the cable of 200 km and 600 km and the situation where no load or an 80 MW load is connected to the second end of the cable 101. Thereby, reference sign differing only in the first digit label input current curves in FIG. 4 that correspond to the curves labelled with a reference sign differing only in the first digit of the corresponding voltage ratios in FIG. 3. For example, the curves 405, 435 represent the input current of a 200 km long cable having no load and an 80 MW load, respectively, connected at the second end of the cable 111. Further, the curves 407, 437 correspond to the cable of length 600 km, when no load or an 80 MW load, respectively, is connected to the second end of the cable.

As can be taken from FIG. 3 and FIG. 4, for a 200 km long cable (200 km step out), 50 Hz (see abscissa 301 in FIGS. 3 and 401 in FIG. 4) may be taken as a possible working frequency, wherein the frequency of 50 Hz is indicated by reference sign 332 or 432, respectively. Here, at 50 Hz, for the case of a 200 km long cable, the change of voltage ration for the situations where no load and where an 80 MW load is connected to the cable is indicated by the value Δ (50 Hz, 200 km). However, for the case of a 600 km long cable, the respective change Δ (50 Hz, 600 km) is very big such (e.g., bigger than the threshold Δr indicated in FIG. 3) that a large voltage change occurs upon changing the load from no load to 80 MW. Thus, it is not possible to operate a 600 km cable at 50 Hz due to voltage amplification and high resonance currents. Compare also the curves 407, 437 for the case of a 600 km long cable, which indicate that the currents at 50 Hz are bigger than allowed according to a rating of the cable. A rating limit (e.g., at a current of 1000 A) is indicated with reference sign 465.

However, at the frequency 100 Hz (reference sign 334, 434), the change of the voltage ratio Δ (100 Hz, 600 km) from no load to an 80 MW load is reasonably small and also the currents of the curves 407, 437 at 100 Hz are below the rating limit 465 of the cable. In particular, the following electrical properties are obtained after simulating transferring AC power 103 with a frequency of 100 Hz through a cable 101 of a length l=600 km:
100 Hz and 600 km cable:
Uload/Uin no load: −1.095 dB=10^(−1.095/20)=0.8816
Uload/Uin load: −6.169 dB=10^(−6.169/20)=0.4915
Input current no load: 367.5 A
Input current load: 686.4 A The voltage difference is, for this frequency 39.0% based on nominal values. At the same time, the current is close to within the nominal current of the cable of 510 A. The cable cross section may be increased to 400 mm² and then the cable current may typically be in the range of 700 A. Here some iteration may need to be done to find an exact suitable cable and frequency.

If the subsea transformer is designed with a high secondary voltage to step the voltage up to typical 1.3 times the nominal subsea distribution voltage, the voltage drop during load may be limited very much compared to nominal load.

To illustrate this, the case bellow might be a solution for a 600 km, 80 MW subsea grid.

100 Hz case based on FIG. 3 and FIG. 4:
Topside Transformer:
Sn_tt=100 MVA
Un_sec=90 kV
Voltage reserves=1.35
Subsea Transformer:
Sn_ts=100 MVA
Un_pri=79.2 kV
Un_sec=36 kV
Voltage reserves=1.35
Subsea Distribution:
Un_distr=27.7 kV
Umax_distr=36 kV (during no-load)
Umin_distr=20.1 kV (during 80 MW load)
Cable Input Current:
Iin_min=367.5 A (during no-load)
Iin_max=686.4 A (during 80 MW load)
Simulated 100 Hz case with optimized subsea transformer ratio:
Topside Transformer:
Sn_tt=100 MVA
Un_sec=90 kV
Voltage reserves=none
Subsea Transformer:
Sn_ts=100 MVA
Un_pri=85.5 kV
Un_sec=36.0 kV
Voltage reserves=none
Subsea Distribution:
Un_distr=27.7 kV
Umax_distr=35.9 kV (during no-load, corresponds to 1.3× Un_distr)
Umin_distr=23.4 kV (during 60 MW load, PF=0.97, corresponds to 0.85×Un_distr)
Cable Input Current:
Iin_min=365.4 A (during no-load)
Iin_max=895.8 A (during 60 MW load, PF=0.97)
Cable Maximum Voltage and Current:
Ic_max=1004 A (during no-load, lower during load)
Ic_max=91 kV (during no-load at topside, lower during load)

Given that a cable current of 1004 A can be handled in the cable looked at, 600 km step out case with 60 MW, PF=0.97 can be achieved. The voltage variations may be within the limits of a typical subsea system. The load could be increased above 60 MW, if voltage where increased topside as a function of the system load.

To reduce the cable current during full load (e.g., to approximately 510 A), the topside voltage could dynamically be increased about 35% (e.g., cable voltage rating may be 123 kV). There may be a risk that parts of the load will be tripped during full load operation and that over voltages into the subsea transformer primary side and switchgear might occur. Normally one cable may be loaded with several loads, so the danger of tripping all loads at the same time should not be very realistic. If this should be a challenge anyway, the most likely voltage source may be converter topside supplying the 100 Hz voltage to the cable. This voltage source might be programmed to trip very fast (e.g., within milliseconds) based on events with sudden current changes. In addition, the subsea transformer might be designed in a way so the saturation of the subsea transformer core during a trip of loads might be saturated and used as an over voltage protection.

When the cable length increases, the damping bands may get more and more narrow, and a clean harmonic free source and load gets more and more important. To ensure a stable voltage subsea regulating, the voltage topside might be a good approach, but also variation the frequency might be a solution that can be evaluated from project to project.

Figure 5:
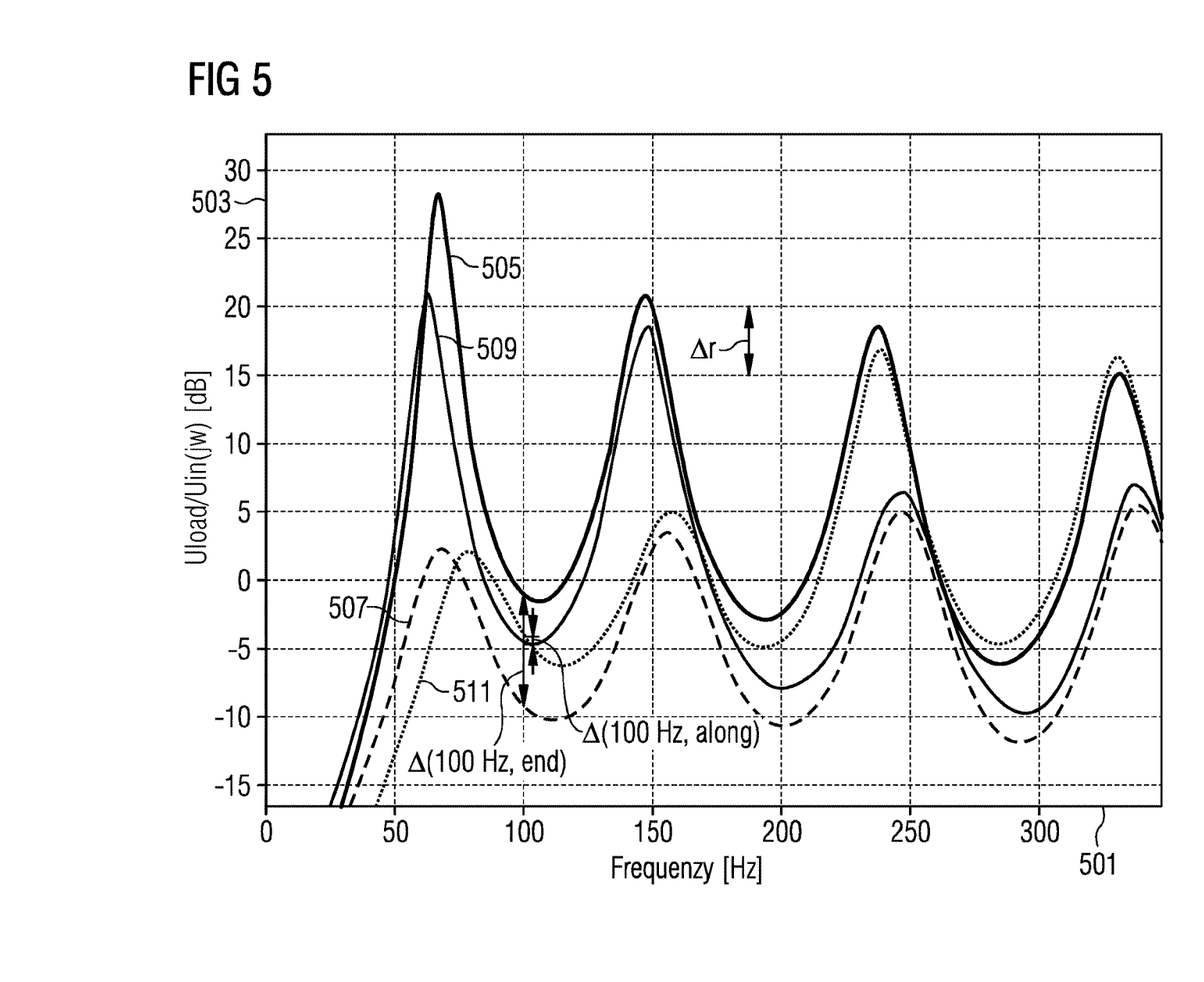
FIG. 5 illustrates a dependency of a voltage ratio from the frequency considered in and illustrating a method for transferring electrical power according to an embodiment when a capacity effect of a cable is compensated for using two or more reactors.
Figure 6:
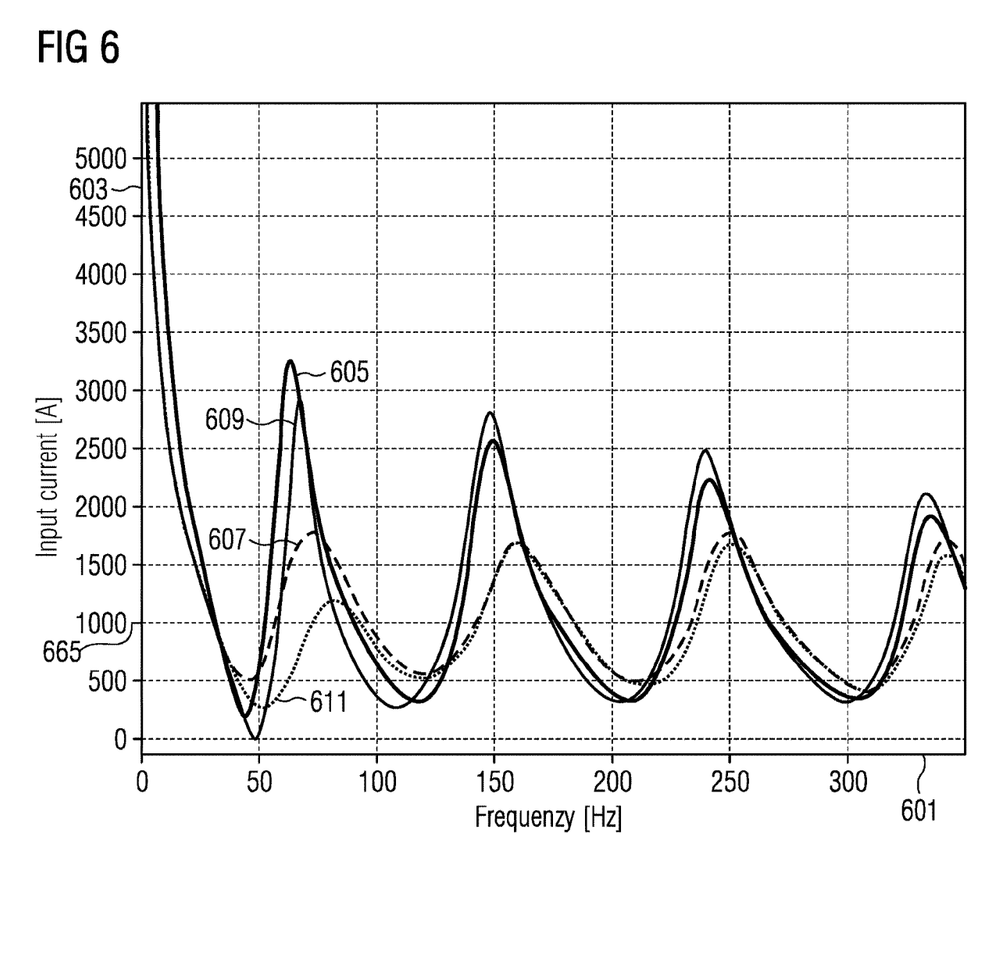
FIG. 6 illustrates a dependency of an input current from the frequency for illustrating a method of transferring electrical power according to an embodiment when a capacity effect of a cable is compensated for using two or more reactors.

Another way of meeting the challenge of long step outs may be to compensation according to cable reactive power. If this is added based on 50 Hz, curves as shown in FIG. 5 and FIG. 6 can be calculated. The curves with end compensation have a reactor in each end of the cable so that the total number of reactors is two. For the case having reactors along the cable equally distributed with the same reactive total value as for the end compensation, the total number of rectors is 50. The compensation units might be a clean inductor or it can be combined with a passive or active filter to even more shape the resonance/damping frequencies.

According to an embodiment, the arrangement 100 may first be operated at a working point 367 (see FIG. 3 corresponding to working point 467 in FIG. 4) (e.g., at 100 Hz for a 600 km long cable). Substantially no load is connected to the second end 117 of the cable 111. Starting from the point 367, the power consumption 126 of the load 127 may be increased, in particular up to a power consumption of 80 MW. Upon increasing the power consumption 126, the frequency of the AC power 103 may be decreased to reach an operation point 369, as is indicated in FIG. 3, wherein the frequency is at a value or is labelled with reference sign 336 which corresponds to about 70-75 Hz. Upon decreasing the frequency from 100 Hz to about 70-75 Hz, the change of the voltage ratio from the situation of no load to a situation of an 80 MW load is substantially 0. Thus, no voltage change, in particular no voltage drop, may occur when the frequency is changed from 100 Hz to about 70-75 Hz upon increasing the power consumption from 0-80 MW.

The different working points are also indicated in FIG. 4 with reference signs differing only in the first digit. As can be taken from FIG. 4, the working point 467 (e.g., 100 Hz for a 600 km long cable, no load) corresponds to an input current well below the rating limit 465 (e.g., assumed to be 1000 A). However, the working point 469 corresponding to the case of a 600 km long cable having an 80 MW load connected to the cable corresponds to an input current above the rating 465. In this situation, either the rating of the cable (e.g., the cable properties) may be adapted or selected, or another working point 471 may be chosen such that the change in the voltage ratio is in an acceptable limit and additionally the input current is below the rating 465.

As can be taken from FIGS. 3 and 4, the working points 367, 369, 371 all lie between a first resonance peak 323 and a second resonance peak 325.

FIGS. 5 to 8 illustrate graphs when a compensation measure for compensating of the capacitor effect of the cable 111 is performed according to embodiments. The compensation methods may be applied exclusively or in combination with the adjustments/selections of frequency which have been described with reference to the FIGS. 2 to 4.

The abscissas 501, 601, 701, and 801 in FIGS. 5 to 8 denote the frequency, while the ordinates 503, 703 denote the voltage ratio of the second voltage $U_{load}$ and the first voltage $U_{in}$, while the ordinates 603, 803 denote the input current 104. Thereby, FIGS. 5 and 6 relate to the cable length l=600 km and illustrate the situations, where reactors are connected at the end points 113, 117 of the cable (curves 505 (no load) and 507 (80 MW load)) or where plural reactors are connected along the cable (curve 509 (no load) and curve 511 (80 MW load)). The reactors are selected (see the reactors 115, 119 and 116 illustrated in FIG. 1) to compensate for 50 Hz. Thereby, the curves 505, 507 have a reactor 115, 119 in each end of the cable 111. Thereby, the total amount of reactors is 2. In the case of reactors along the cable (curves 509, 511), the reactors 116 are equally distributed with the same reactive total value as for the end compensation. The total amount or the total number of reactors 116 is 50, in the illustrated example. Other numbers are possible. The compensation units (also referred to as reactors 115, 116, 119) may be clean inductors or may be combined with a passive or active filter to even more shape the resonances/damping frequencies. For 100 Hz, the change of the voltage ratio Δ (100 Hz, along) with reactors distributed along the cable is smaller (e.g., smaller than the threshold Δr) than the voltage ratio Δ (100 Hz, end) with reactors connected at two ends the cable.

Figure 7:
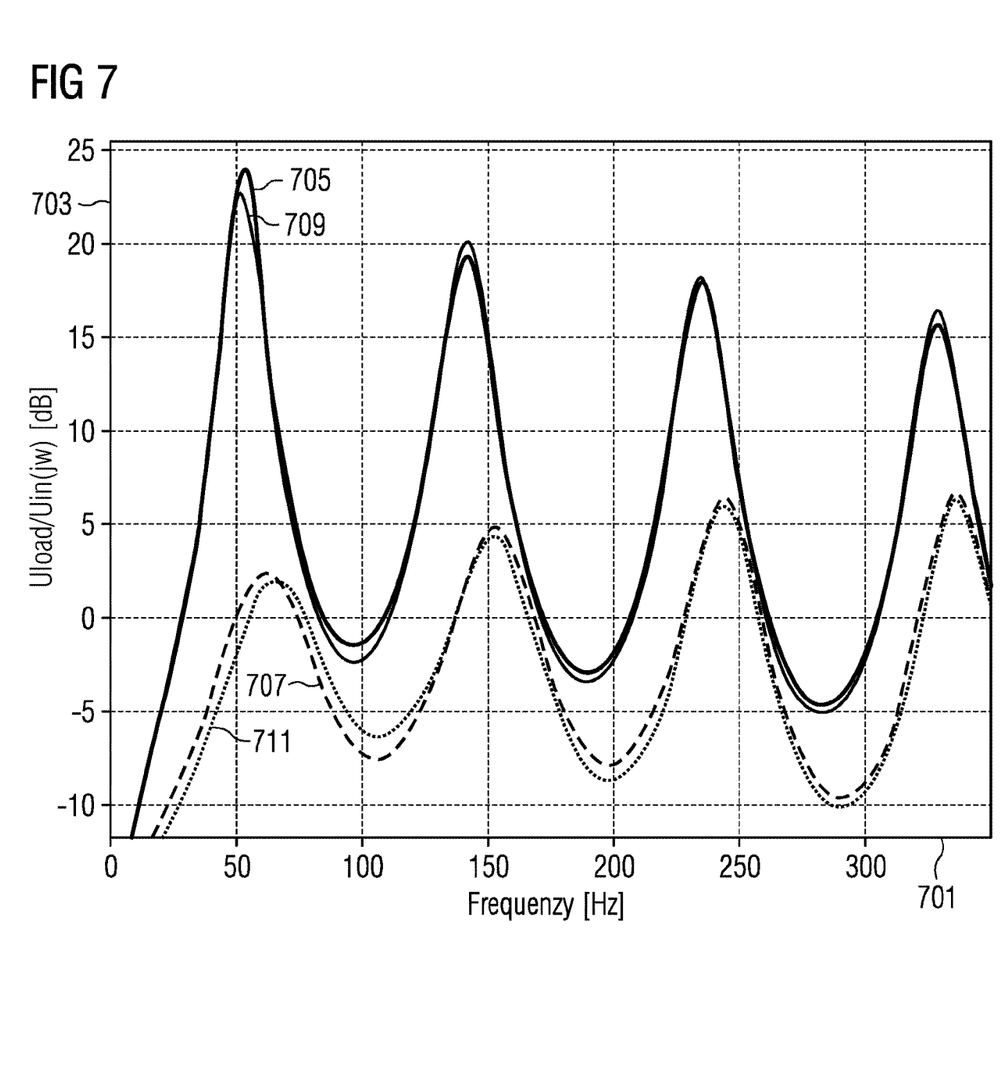
FIG. 7 illustrates a dependency of a voltage ratio from the frequency of AC power when a capacity effect of a cable is compensated for using two or more reactors.
Figure 8:
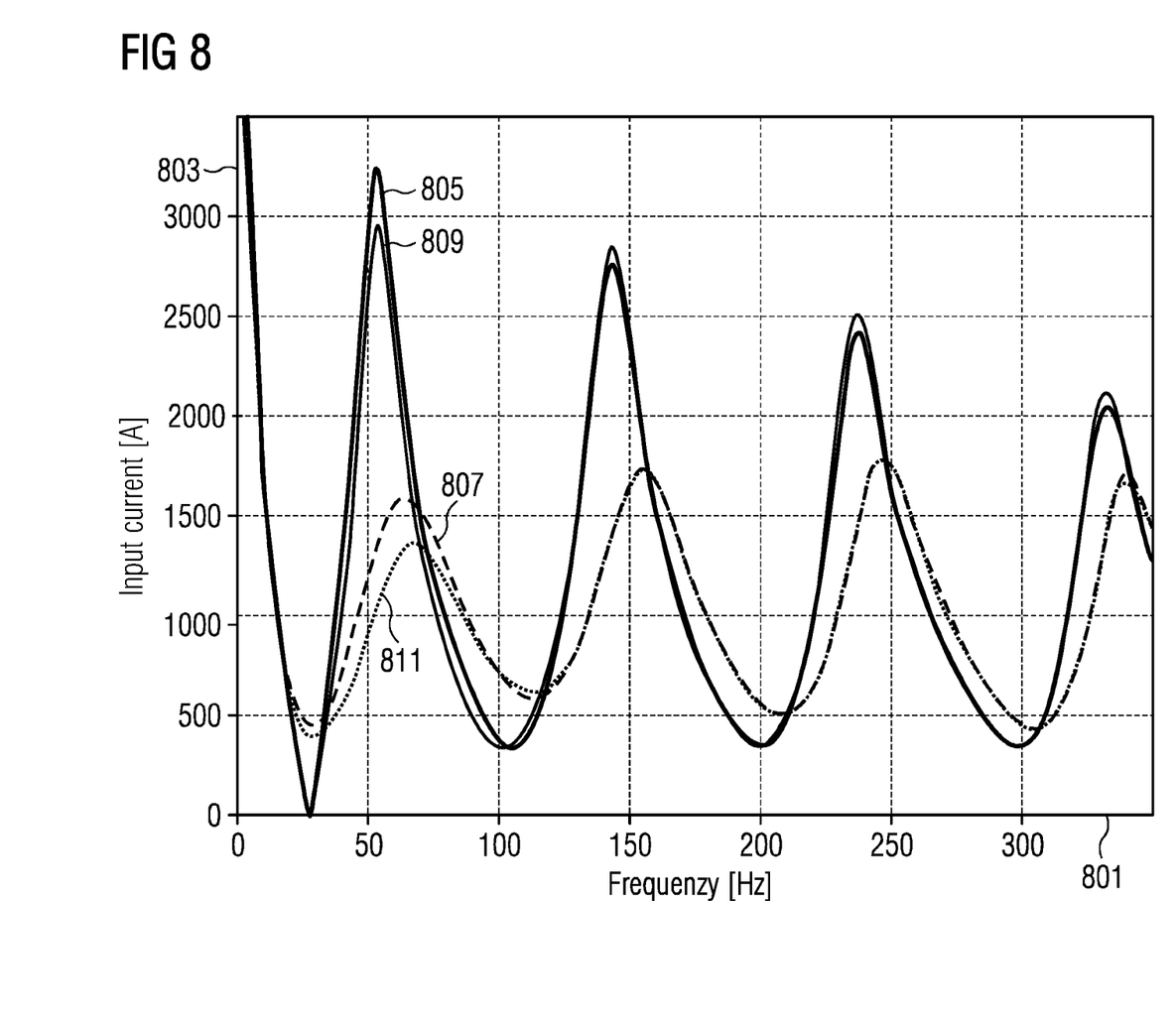
FIG. 8 illustrates a dependency of an input current from the frequency when a capacity effect of the cable is compensated for using two or more reactors connected to the cable.

When the size of the reactors 115, 116 and/or 119 is changed to 16.7 Hz and compensation and the other parameters are kept constant as for the 50 Hz case illustrated in FIGS. 5 and 6, the graphs as illustrated in FIGS. 7 and 8 are obtained. Thereby, the curves are labelled with reference signs differing only in the first digit compared to the reference signs used in FIGS. 5 and 6.

By appropriately adjusting the reactive total value of the reactors 115, 116 and 119, a change in the voltage ratio may be kept within acceptable limits and also the input current may be kept below a rating limit of the cable 111.

According to the disclosure of this application, three main approaches are described, in order to provide a method and an arrangement for transferring electrical power in the sea. The first approach uses the resonance effect active in the cable, to stabilize the voltage at subsea, such as by selecting/adjusting the frequency depending on the cable length. A second approach performs a reactive compensation of a subsea supply cable along the length or at end points of the cable, to limit out the capacitive effect of the cable. A third approach uses, for example, a topside converter to generate a required frequency and may apply or employ the converter to vary (e.g., slowly) the topside frequency and/or voltage as a function of a power consumption of the load connected at the subsea location. Further, in case of a trip of the load, the topside source may react very fast by tripping or to actively regulate down the voltage and damp out transients.

According to embodiments, these three approaches may be performed separately or in any combination (e.g., the first approach, the second approach and the third approach may each be performed separately without performing the respective other approaches). Alternatively, two of the approaches (e.g., the first and the second, the first and the third, or the second and the third) approach may be performed in combination. Still further, all approaches, the first, the second and the third approach may be performed in combination.

In particular, according to the first approach, the cable capacitor effect may be utilized, to stabilize the subsea voltage from a situation where no load is connected to a situation where a load with a high power consumption is connected to the end of the cable, where the end is located at the subsea location. This can be performed, for example, by looking or using frequencies higher than the lowest resonance frequency of the cable. This may be an alternative for the extreme long step-outs where the first cable resonance comes in conflict with the fundamental 50 Hz in a standard AC system.

The second approach may apply to compensate for the reactive power generated in the cable, along the cable or at the ends of the cable. If this is done, the voltage drop from no-load to a high power consumption load may be typically given by the serial impedance. This second approach may be a good solution for shorter step-outs such as step-outs (i.e. cable lengths) between 100 km and 300 km.

In particular, power consumption of the load may be in the range of 50-100 MW. Further, transient conditions can be taken into account. Thereby, for example, a topside converter may be configured to damp out transients in the cable system.

In particular, a working frequency may be set such that core losses, skin/proxy-effect are in reasonable limits.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for transferring electrical power, the method comprising:
generating AC power;
guiding the AC power through a cable from a first end of the cable to a second end of the cable; and
adjusting a frequency of the AC power guided through the cable in dependence of a length of the cable between the first end and the second end of the cable, wherein the frequency is adjusted such that a voltage ratio between a second voltage and a first voltage changes less than a threshold, when a power consumption of a load connected to the second end of the cable changes from a first value to a second value,
wherein the second voltage is indicative of a potential difference between the second end of the cable and a reference potential, and
wherein the first voltage represents a potential difference between the first end of the cable and the reference potential.

2. The method according to claim 1 wherein the power consumption changes from 0 MW to 100 MW.

3. A method for transferring electrical power, the method comprising:
generating AC power;
guiding the AC power through a cable from a first end of the cable to a second end of the cable; and
adjusting a frequency of the AC power guided through the cable in dependence of a length of the cable between the first end and the second end of the cable, wherein the frequency is adjusted such that a second voltage changes less than a voltage threshold, when a power consumption of a load connected to the second end of the cable changes from a first value to a second value,
wherein the second voltage is indicative of a potential difference between the second end of the cable and a reference potential,
the method further comprising:
supplying the AC power from the second end to the load.

4. The method according to claim 1, wherein an absolute value of the threshold is 0.5.

5. The method according to claim 1, wherein an absolute value of the threshold is 0.2.

6. The method according to claim 1, wherein adjusting the frequency comprises calculating plural voltage ratio changes for plural test frequencies, for each test frequency considering at least two test power consumptions of loads in order to obtain the respective voltage ratio change,
wherein the frequency to be adjusted is selected from the plural test frequencies for which the calculated voltage ratio change is lower than the threshold.

7. The method according to claim 1, further comprising
calculating plural input currents for plural test frequencies, the input current representing a respective current of the generated AC power supplied to the first end of the cable, and
for each test frequency, considering at least one test power consumption of a load,
wherein the frequency to be adjusted is selected from the plural test frequencies for which the input current is within a range according to a rating of the cable.

8. A method for transferring electrical power, the method comprising:
generating AC power;
guiding the AC power through a cable from a first end of the cable to a second end of the cable; and
adjusting a frequency of the AC power guided through the cable in dependence of a length of the cable between the first end and the second end of the cable, wherein the frequency between resonance peaks according to a calculated voltage ratio is selected as between a first and a second resonance peak or between the second and a third resonance peak,
wherein the frequency further depends on properties of the cable.

9. The method according to claim 1, further comprising:
transforming a voltage of the AC power to a higher voltage and supplying the transformed voltage to the first end of the cable.

10. The method according to claim 1, further comprising:
transforming the AC power guided through the cable at the second end of the cable and supplying the transformed AC power to a load.

11. The method according to claim 1, wherein the frequency of the AC power is between 10 Hz and 300 Hz,
wherein 80-100% of the cable is arranged underwater.

12. The method according to claim 1, wherein the AC power is supplied from an AC power supply comprising a generator or a converter to the first end of the cable.

13. The method according to claim 1, wherein the first voltage is predetermined and the second voltage is calculated for a given power consumption of the load.

14. The method according to claim 13 wherein the second voltage is calculated utilizing a model of the cable with PI-elements.

15. The method according to claim 1, wherein the second end of the cable is between 100 m and 4000 m below sea level, and wherein the cable has a length between 100 km and 1000 km.

16. The method according to claim 1, wherein the voltage at the cable is between 80 kV and 100 kV.

17. The method according to claim 1, further comprising:
connecting a first reactor near the first end of the cable, connecting a second reactor near the second end of the cable, connecting plural reactors at plural locations along the cable, or combinations thereof,
further comprising, depending on the load, adjusting the frequency, the first voltage, or both when power consumption of the load increases.

18. The method according to claim 17 wherein adjusting the frequency comprises decreasing the frequency.

19. The method according to claim 1 wherein guiding comprises guiding at least partially underwater.

20. The method according to claim 1 wherein adjusting comprises adjusting the frequency of the AC power to be larger than a power grid frequency.

21. The method according to claim 20 wherein adjusting to be larger than the power grid frequency comprises adjusting to be larger than 50-60 Hz.

22. An arrangement for transferring electrical power in the sea, the arrangement comprising:
a power source operable to generate AC power;
a cable having a first end to which the AC power is supplied and being arranged to guide the AC power to a second end of the cable,
wherein the power source includes a converter configured to adjust a frequency of the AC power guided through the cable in dependence of a length of the cable between the first end and the second end of the cable to be larger than a conventional grid frequency, wherein the power source is configured to adjust the frequency such that a voltage ratio between a second voltage and a first voltage changes less than a threshold, when a power consumption of a load connected to the second end of the cable changes from a first value to a second value,
wherein the second voltage is indicative of a potential difference between the second end of the cable and a reference potential,
wherein the first voltage represents a potential difference between the first end of the cable and the reference potential.

23. An arrangement for transferring electrical power in the sea, the arrangement comprising:
a power source operable to generate AC power;
a cable having a first end to which the AC power is supplied and being arranged to guide the AC power to a second end of the cable,
wherein the power source includes a converter configured to adjust a frequency of the AC power guided through the cable in dependence of a length of the cable between the first end and the second end of the cable to be larger than a conventional grid frequency, wherein the power source is configured to adjust the frequency such that a second voltage changes less than a voltage threshold, when a power consumption of the AC power supplied to a load connected to the second end of the cable changes from a first value to a second value,
wherein the second voltage is indicative of a potential difference between the second end of the cable and a reference potential.

24. An arrangement for transferring electrical power in the sea, the arrangement comprising:
a power source operable to generate AC power;
a cable having a first end to which the AC power is supplied and being arranged to guide the AC power to a second end of the cable,
wherein the power source includes a converter configured to adjust a frequency of the AC power guided through the cable in dependence of a length of the cable between the first end and the second end of the cable to be larger than a conventional grid frequency, wherein the power source is configured to select the frequency between resonance peaks according to a calculated voltage ratio, the selection being between a first and a second resonance peak or between the second and a third resonance peak, wherein the frequency further depends on properties of the cable.

* * * * *